United States Patent Office 3,431,899
Patented Mar. 11, 1969

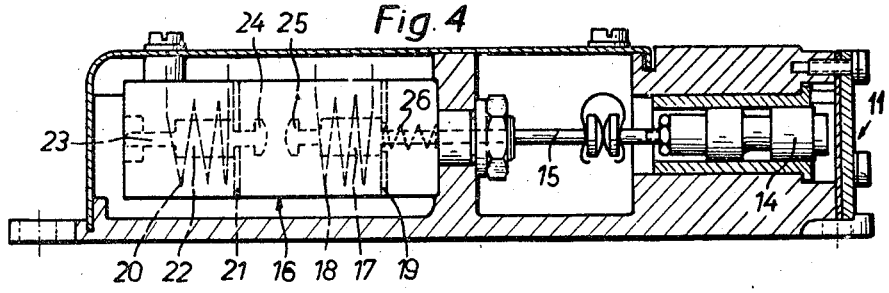
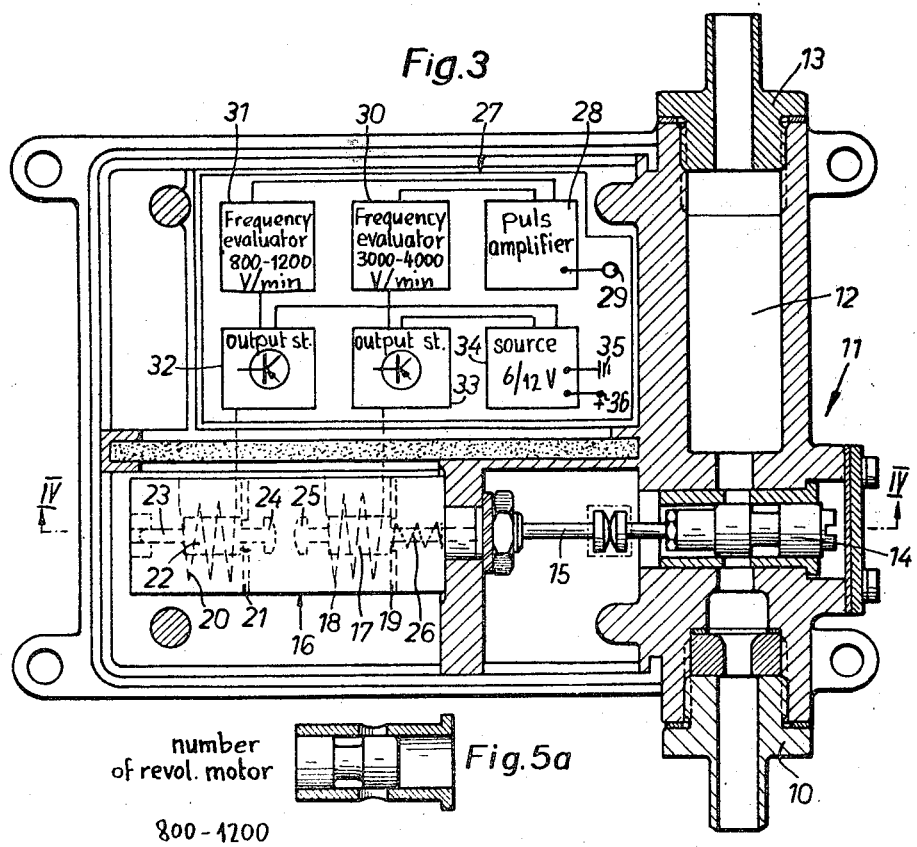
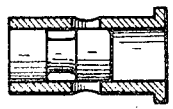
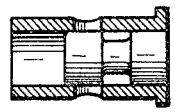
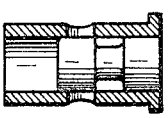

3,431,899
DEVICE FOR DELIVERING SUPPLEMENTARY AIR TO THE FUEL-AIR MIXTURE IN FOUR-STROKE-CYCLE ENGINES
Alfred Neidhart, Kusnacht, Zurich, Switzerland, assignor to Merkurium A.G., Kusnacht, Zurich, Switzerland
Filed Aug. 26, 1966, Ser. No. 575,410
Claims priority, application Switzerland, Aug. 31, 1965, 12,160/65
U.S. Cl. 123—119   3 Claims
Int. Cl. F02m 3/04, 23/06

ABSTRACT OF THE DISCLOSURE

A device for reducing the carbon monoxide content of engine exhaust comprises means for supplying supplemental air to the engine to provide a leaner mixture at speeds less than maximum speed and greater than minimum speed. Means for controlling the supplemental air comprises a conduit, a valve for opening and closing the conduit and means for controlling the valve as a function of engine speed. The control means comprises a pulse generator producing pulses representative of engine speed and an electrical circuit including a pulse amplifier to which said pulses are applied.

---

The exhaust of four-stroke-cycle engines (also called Otto engines) contains a considerable amount of highly poisonous carbon monoxide, in addition to other poisonous components. When an Otto engine runs in a closed area, the CO concentration very quickly becomes perilous. Even in city traffic the poisoning of the air is so great today as to cause a public stir.

It has long been known that the addition of supplementary air to the fuel-air mixture reduces the CO content in the exhaust of Otto engines. The prior art has examples of devices for delivering, and regulating the delivery of, supplementary air to the fuel-air mixture in Otto engines. With these devices the supplementary air is fed to the intake manifold; the lean fuel-air mixture is made turbulent by guide vanes and thus mixed together.

These devices do not have the desired results, because the addition of the supplementary air is not satisfactorily controlled.

A purpose of the invention is a device that assures an even distribution of the supplementary air in the fuel-air mixture.

Another purpose of the invention is a device assuring an improved regulation of the supplementary air.

The invention will now be described, with reference to the accompanying drawings, wherein:

FIG. 3 is a side view, partly in section, of a first embodiment of the device for regulating the delivery of supplementary air;

FIG. 4 is a view taken along line IV—IV of FIG. 3;

FIG. 5 is a view, partly in section, of the three major positions of the piston;

Figure 1:
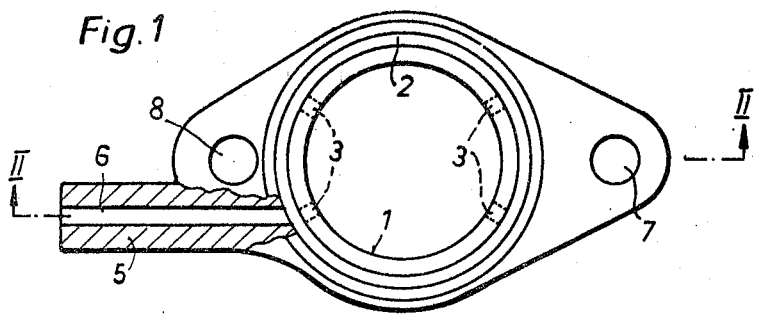
FIG. 1 is a top view, partly broken away, of the connecting part between the carburator and the intake manifold of an Otto engine.
Figure 2:
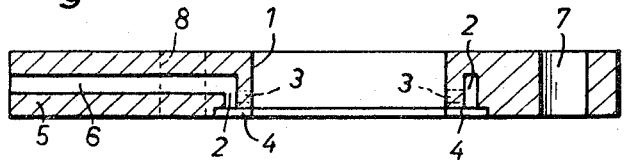
FIG. 2 is a view taken along line II—II of FIG. 1.

Referring to FIGS. 1 and 2, the connecting part is constructed in the general shape of a flange incorporating a central opening 1, a groove 2 surrounding the opening, and four ducts or conduits 3 communicating between the groove 2 and the opening 1. A gasket 4, recessed in the flange, closes off the groove 2. The groove communicates with a supply passage or conduit 6 in a projection 5 of the flange.

By means of screws passing through the holes 7, 8 the part is mounted between the carburator and the intake manifold (not shown) of a four-stroke-cycle engine, also called an Otto engine. The opening 1 provides a port between the carburator and the manifold.

A hose (not shown) connects the conduit 6 with a threaded pipe 10 (FIGS. 3, 4), which provides the connection to the piston valve 11. The piston valve is connected to an equalizing chamber 12 leading to a threaded pipe 13. A hose (not shown) connects the pipe 13 to the motor's crankshaft housing. The house could also be connected to another suitable source of air. The piston 14 of the piston valve 11 is connected to a thrust rod 15 controlled by two electromagnets 16. The thrust rod is connected to the core 17 of the second electromagnet of the magnets 16. The second magnet has a winding 18 surrounding the core and a stop 19. The first electromagnet of the magnet 16 comprises also a winding 20, a stop 21, and a core 22. The first magnet also includes a thrust rod 23. The rod 23 terminates in an enlarged rounded end 24 that cooperates with a like end 25 of the rod 15. The two rods act upon a compression spring 26. The magnet 16 is energized by a transistorized control 27 that incorporates a pulse amplifier 28 of which the input terminal 29 is connected to the contact-breaker point of the ignition system. The output of the pulse amplifier 28 is connected to the inputs of two parallel frequency evaluators 30, 31. The evaluator 31 is adjustable for a motor r.p.m. in the range of 800 to 1200 and supplies a pulse to a transistorized output stage 32 when the motor turns near the chosen value. The pulsed output stage closes a first circuit, which energizes the winding 20. The evaluator 30 is adjustable for a motor r.p.m. of from 3000 to 4000 and supplies a pulse to a transistorized output stage 33 when the motor turns near the chosen value. The pulsed stage closes a second circuit, which energizes the winding 18. The two stages 32, 33 are fed from a stabilized $6/_{12}$ volt supply 34 of which the input terminals 35, 36 are respectively grounded and connected to the output terminal of a battery.

The described regulating device operates as follows.

When the engine idles the piston 14 is shifted leftwards (FIG. 5a), completely or at least mostly closing the passage from the crankshaft housing to the connecting part of FIGS. 1 and 2. The thrust rod 23 and core 22 (FIGS. 3, 4) are also shifted leftwards, the end 24 bearing against the stop 21, by the contacting end 25, which is forced leftwards by the compression spring 26. If the motor's r.p.m. slowly increases until it reaches a first predetermined limit that coincides with that to which the evaluator 31 is set, the evaluator pulses the output stage 32, closing the first circuit and energizing the winding 20. The core 22 and thrust rod 23 are shifted rightwards until the core is brought up against the stop 21. The stroke is transmitted to the piston 14 via the thrust rod 15, against the bias of the spring 26. The piston 14 is thus located in the position shown at FIG. 5b, completely opening the passage between the crankshaft housing and the supply part. The crankshaft gases (including air which is the desired supplementary air) are sucked into the fuel-air mixture via the equalizing chamber 12 (FIG. 3), the piston valve 11, and the connecting part of FIGS. 1, 2. If the motor's r.p.m. increases further until it reaches a second predetermined limit that coincides with that to which the evaluator 30 is set, the evaluator pulses the stage 33, closing the second circuit and energizing the winding 18, winding 20 remaining energized. The core 17 and rod 15 are again moved rightwards. The second stroke causes the piston 14 to assume the position of FIG. 5c, completely closing the passage between crankshaft housing and the connecting part. Should the motor's r.p.m. now decrease, the energization of the winding 18 is discontinued when the motor's speed falls below the set value; and the piston 14 is forced by the spring 26 to return to the position of FIG. 5b, reopening the passage.

If the motor further slows down, energization of the other winding 22 is discontinued, the piston 14 shifted further leftwards, and the passage reclosed. The engine idles.

Figure 6:
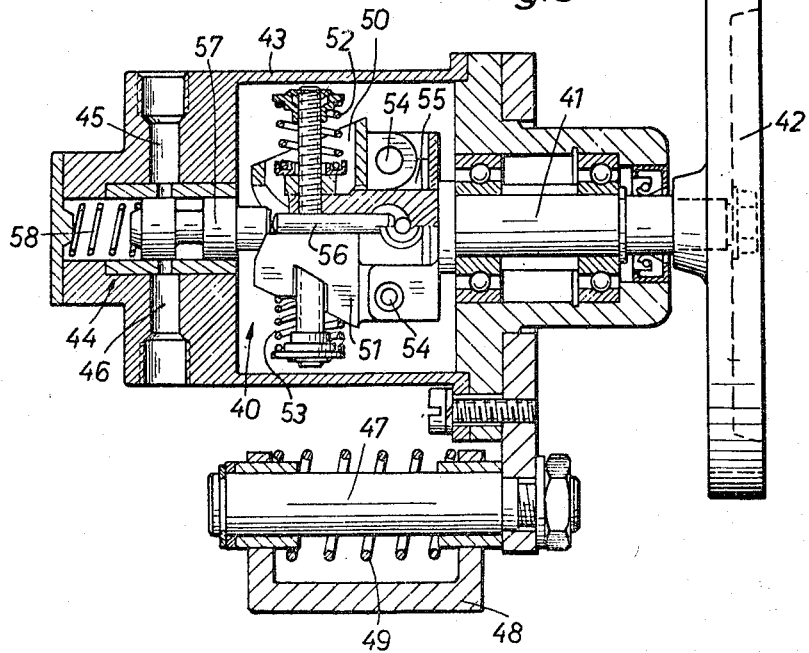
FIG. 6 is a side view, partly in section, of a second embodiment of the device.

The second embodiment of the regulating device, shown at FIG. 6, includes a centrifugal governor 40, driven by an axle 41 and wheel 42 off the engine, and controlling the supply of supplementary air to the connecting part. A valve 44 and bores 45, 46 respectively leading to and from the valve are located in a housing 43. The bores 45, 46 are respectively connected with the crankshaft housing and the connecting part.

The housing 43 is rotatably connected via an axle 47 to a support 48 mounted on the current generator (not shown). A torsion spring 49 presses the wheel 42 against the fan belt (not shown). When the governor is driven by the engine via the wheel 42 and axle 41, two weights 50, 51 are forced outwards by centrifugal force against the bias of compression springs 52, 53 and thereby caused to pivot about pins 54. The rotation is transmitted as a translational movement of a thrust rod 56 via an arm 55, whereby the rod moves a piston 57 against the force of a compression spring 58, controlling the opening and closing of the passage between the crankshaft housing and the connecting part.

When the engine is idling, the centrifugal force acting on the two weights 50, 51 is not sufficient to oppose the force of the springs 52, 53. The passage remains closed by the piston 57. If the motor's r.p.m. increases continuously, the centrifugal force acting on the weights 50, 51 also increases, causing the latter to pivot about the pins 54. This pivoting is transmitted to the piston 57 as a translational movement via the rod 56, whereby upon reaching a given lower value of the r.p.m. the passage is completely opened. If the r.p.m. further increases, the piston 57 is forced leftwards, slowly closing the passage, until, at a given upper value of the r.p.m., the passage is completely closed.

Figure 7:
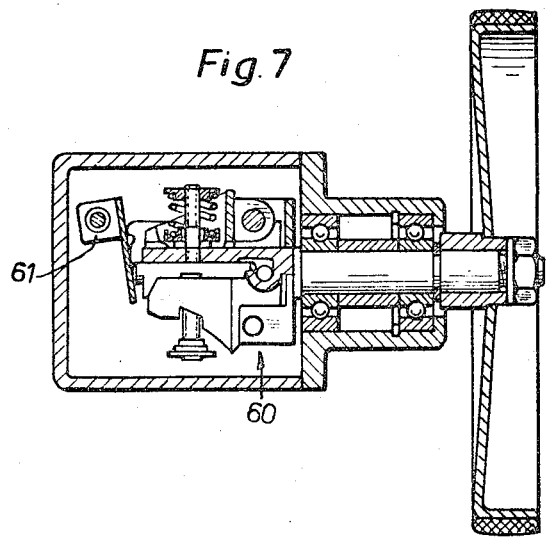
FIG. 7 is a side view in section of a third embodiment of the device.

In the embodiment of FIG. 7, the pivoting of the centrifugal governor is converted to a rectilinear movement which operates a two-position switch 61 that controls a piston (not shown), similar to piston 14 of FIG. 3, via two electromagnets (not shown), similar to the two magnets 16 of FIG. 3. When the engine's r.p.m. exceeds a given lower value, the governor operates the switch 61, which connects the first electromagnet to a current source, moving the piston through the stroke of the magnet core to the open-passage position. When the engine's r.p.m. reaches a given upper value, the second magnet is energized, further shifting the piston and closing the passage.

Figure 8:
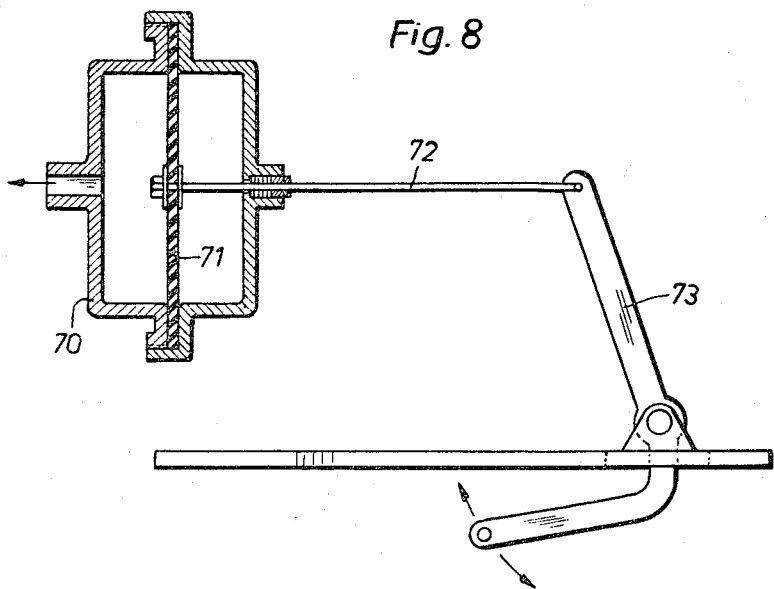
FIG. 8 is a side view, partly in section, of a fourth embodiment of the device.

In the embodiment of FIG. 8, the regulating device includes a housing 70 enclosing an airtight chamber having stretched across it a membrane 71. The membrane controls, via rod 72 and lever 73, the position of a piston to 14 or 57 of the preceding embodiments. The chamber is connected by a hose (not shown) to the intake manifold. The membrane controls the opening and closing of the passage between the crankshaft housing and the connecting part in dependence on the negative pressure in the intake manifold.

The invention admitting of modifications lying within its purview, as recognized by those skilled in the art, its scope is limited solely by the appended claims.

I claim:

1. For use in an internal combustion engine having an air-fuel mixture source including a source of air continuously providing air for said mixture during operation, the improvement which comprises, means independent of said source of air and supplemental to said source of air to supply a supplemental supply of air to said air fuel mixture in dependence upon the speed of the engine thereby to lean said fuel-air mixture during operation of said engine at speeds less than the maximum speed of the engine and greater than the minimum speed of said engine thereby to reduce the carbon monoxide content of the exhaust of the engine, said means comprising control means responsive to the speed of the engine, conduit means, and a valve opening and closing said conduit means under control of said control means, said control means comprising electrical circuit means responsive to idling of said engine for opening said valve at a speed greater than said idling speed, said electrical circuit means comprising a pulse amplifier, and said control means comprising means evaluating the speed of the engine and developing pulses at a frequency representative of the speed of the engine, and means to apply said pulses to said pulse amplifier.

2. The improvement according to claim 1, in which said electrical circuit means comprises electromagnetic means actuating said valve, and connections from said pulse amplifier to said electromagnetic means, whereby said valve is closed and opened at selected frequencies corresponding to given engine speeds at which said valve is desired to be opened and closed.

3. The improvement according to claim 1, in which said valve comprises a piston movable rectilinearly.

References Cited

UNITED STATES PATENTS

| 1,344,001 | 6/1920 | Jones | 123—119 |
| 2,154,593 | 4/1939 | Way | 123—119 |
| 3,238,713 | 3/1966 | Wallace | 123—119 X |

FOREIGN PATENTS

| 766,707 | 4/1934 | France. |

WENDELL E. BURNS, Primary Examiner.

U.S. Cl. X.R.

123—97, 106